Oct. 4, 1938.　　　D. G. KAPPELMAN　　　2,131,740
GAS VALVE
Filed June 25, 1937
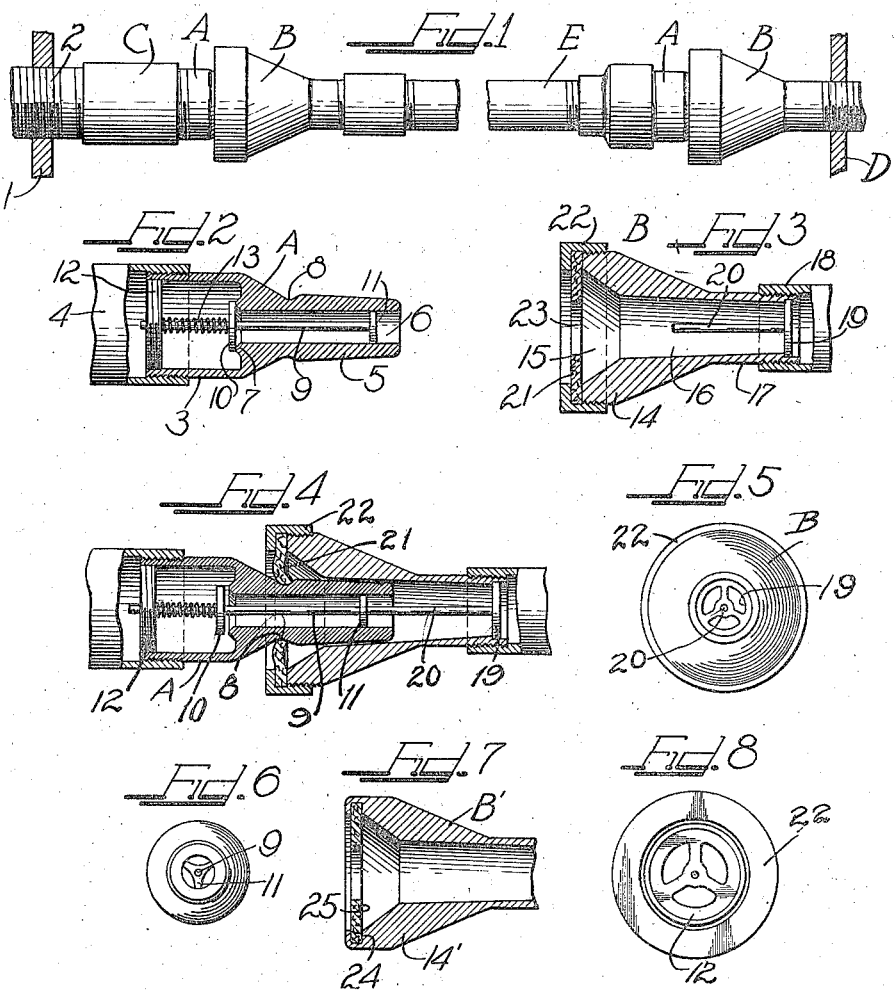
Inventor
DONALD G. KAPPELMAN Patented Oct. 4, 1938

2,131,740

UNITED STATES PATENT OFFICE 2,131,740

GAS VALVE

Donald G. Kappelman, Chicago, Ill.

Application June 25, 1937, Serial No. 150,250

1 Claim. (Cl. 284—18)

The present invention relates to a gas valve and more particularly to a two-part connection for use in a branch connection from a gas pipe or conduit to an appliance, such as a gas stove, gas iron, washing machine, or the like, to positively shut off the gas in the event the connection to the appliance is accidentally parted.

In connection with the use of gas appliances, it is usual, particularly in the home, to connect such appliances to gas lines by means of flexible hose, an end of the hose being pushed over a corrugated neck and held in position by the resiliency of the hose. Oftentimes someone trips over such a hose disconnecting it from the appliance, or from the supply, whereupon gas escapes to the atmosphere carrying with it sickness and sometimes death.

It is to prevent such gas escape when an appliance is accidentally disconnected from a gas main, that the present invention is directed.

An object of the present invention is to provide a two-part device which may be interposed in a branch gas line, so constructed that when the parts are connected gas flow is permitted, and should the parts become accidentally disconnected, the flow is automatically stopped.

Another object of the present invention is to provide a two-part gas valve structure for use with auxiliary gas lines, so constructed that the parts may be easily separated, which separation effectually stops gas escape.

A further object of the present invention is to provide a two-part device for use with branch gas lines, one of which parts carries a normally closed valve arrangement, and the other of the parts carries means for opening the valve to gas flow when the parts are connected together by relative endwise movement and wherein the valve is maintained open as long as the parts are connected but wherein the valve automatically closes when the parts are separated.

The above, other, and further objects of the present invention will be apparent from the following description and accompanying drawing.

The accompanying drawing illustrates embodiments of the present invention, and the views thereof are as follows:

Figure 1 is a view in elevation, with the parts broken away, showing two of the devices of the present invention installed in an auxiliary gas line for connecting an accessory to a gas main.

Figure 2 is an axial sectional view through the male member of one form of the invention.

Figure 3 is an axial view of a mating female member for use with the member of Figure 2.

Figure 4 is an axial view of the male and female members connected in operative relationship, showing the valve in open position.

Figure 5 is an end view of the female member of Figure 3, looking at the right hand end thereof, with the hose removed.

Figure 6 is an end view of the male member, looking at the right hand end of Figure 2.

Figure 7 is a fragmental axial sectional view through the female member, showing a different manner of supporting the locking washer in the member.

Figure 8 is an end view of the assembled male and female members, looking at the left hand end of Figure 4, with the pipe or hose removed.

The drawing will now be explained.

In Figure 1, reference numeral 1 represents a section of a wall through which a gas pipe 2 projects and which forms part of a gas supply main.

The male member A of the device is formed with a cylindrical skirt portion 3 exteriorly threaded to threadedly engage a pipe or hose 4. As an integral part of the member, there is an elongated neck 5 projecting from the skirt portion as shown. The neck is centrally bored as at 6, and the member is formed with an annular valve seat 7 at the end of the bore 6 in communication with the interior of the skirt. The exterior of the neck 5 is smooth, except for an annular recess 8 formed on it adjacent the skirt portion, for a purpose to be later explained. The exterior of the neck is preferably tapered, slightly, towards the free end of the neck to cooperate with a similarly tapered bore in the female member for the purpose of centering the male and female members when connected.

A stem 9 extends through the interior of the skirt portion 3 and into the bore 6. A disc 10 is secured to the stem and serves as a valve member for engaging the seat 7 to close flow communication between the interior of the skirt and the bore 6 of the neck. At the outer end of the stem, which is the right hand end as viewed in Figures 2 and 4, an apertured disc 11 is attached, the periphery of which travels within the bore 6 and serves as a guide for this end of the stem. The disc 11 is, in Figure 6, shown as formed with three arms diverging from a central hub portion which receives the stem 9.

The other end of the skirt is equipped with an apertured disc 12 which has a centrally disposed opening to receive one end of the stem 9 for guiding this end of the stem as it is moved within the member. One form of construction of the disc 12 is illustrated in Figure 8.

Interposed between the disc 12 and the valve member 10 is a spring 13, which surrounds the stem 9 and functions to maintain the valve member normally seated, thus normally closing flow through the male member.

In Figure 1 the male member A is shown as attached to the pipe 2 by a coupling C.

The female member B of the device is fashioned to provide an enlarged end 14 which has a conically shaped interior surface 15 extending inwardly for a short distance, where it communicates with a bore 16 slightly tapered, convergently, towards the right hand end of the member, as shown in the drawing. The member is formed with a neck portion 17 which is exteriorly threaded to receive a hose or pipe 18.

Secured adjacent the extremity of the neck 17, as by threading or swedging, is an apertured disc 19 of the character shown in Figure 5, which at its center carries a pin 20 extending axially part way of the bore 16 towards the left hand end of the member, as viewed in the drawing.

At the extremity of the enlarged end 14, a washer of resilient material, such as rubber or rubber composition, indicated at 21, is supported against the extremity of this end of the member by means of a ring nut 22 threaded onto the exterior of the member. The washer has a central opening 23 having a diameter less than the minimum diameter of the tapered neck of the male member, so that when the members are connected together by relative endwise movement, the washer will effectively seal the union between these members against gas escape.

In Figure 1, the female member B appears as connected to the member A at the supply end of the line, while a second female member B is secured to a second male member A adjacent an accessory, such as represented at D, which may be a gas stove, a gas iron, a washing machine, or other gas using appliance.

Joining the two members A and B, of Figure 1, is a hose or other conduit E. This is shown as a pipe, although it is to be understood that it might be a flexible hose of the type commonly used for connecting gas appliances to gas outlets.

In utilizing the device of the present invention, the male member A will be secured to the gas line or conduit 2, and the female member B will be attached to one end of the auxiliary conduit, such as a hose E. At the other end of the hose will be applied a male member A, while another female member B will be attached to the appliance.

The male and female members are connected together in operative relation by relative endwise movement.

In connecting the members A and B together, by relative endwise movement, the neck 5 of the male member is entered through the aperture 23 in the washer and then moved into the bore 16 of the female member. The conical surface 15 of the female member will serve to direct the end of the neck 5 of the male member into the female member bore if perchance these should be moved together carelessly. During such relative movement the washer 21 passes over the neck 5 until it engages the annular recess 8. By the time the washer engages the annular recess 8, the pin 20 of the female member has engaged the stem 9 of the valve structure of the male member, and has displaced the valve from its seat, thus opening the male member to gas flow. The tapering of the neck 5 and the bore 16 of the female member aids in centering the stem and pin to assure opening the valve when the two members are connected together.

It is to be noted that the relationship of the parts is such that the washer 21 does not engage the annular recess 8 to connect the members together in operative relation until after the valve has been unseated, thus assuring that when the members are properly connected together, gas flow through the male member is possible.

Figure 4 illustrates the arrangement of the parts when the two members are connected together in gas flow relation, and shows the washer slightly distorted which it becomes when applied over the neck 5 of the male member.

Instead of applying the washer 21 in the manner shown in Figure 3, it might be applied as shown in Figure 7, in which construction the enlarged head 14' of the female member B' is, at its left extremity, formed with an annular margin providing a shoulder 24 against which a washer 25 may be seated. After the washer has been seated, the margin is spun or otherwise clinched over the washer to hold it in position.

The form of the device, as described, is one comprising two members which are connected together and separated by relative endwise movement and in which one of the members is provided with normally closed valve means, the other member being provided with means for opening the valve means to gas flow when the two members are connected together. The connection is such that when any separation occurs the valve automatically closes.

In the construction of the form shown in Figures 1 to 8 inclusive, should a fire occur in the neighborhood of a device of the present invention, the washer would melt to such an extent as to release the tight engagement between the male and female members, thereupon allowing slight movement of the female member with respect to the male member so that the valve might automatically be closed thus shutting off gas escape. The strength of the spring 13 is designed to urge the valve to closed or seated position and to shift the member B with respect to the member A whenever the holding means, that is, the washer 21, or the washer 25 of Fig. 7, fails to hold.

It will also be observed that the construction of the devices shown contemplates the provision of means which may be spoiled by abnormal heat to effect automatic shut-off of the gas in the event fire occurs in the neighborhood of the devices.

The spring 13 is effective to normally urge the valve 10 towards its seat and possesses sufficient ability to shift the members apart, in the event of failure of the washer to hold, thereby automatically closing the male member to gas flow.

The invention has been described herein more or less precisely as to details, yet it is to be understood that the invention is not limited thereby, as changes may be made in the arrangement and proportion of parts, and equivalents may be substituted, without departing from the spirit and scope of the invention.

The invention is claimed as follows:

A device for connecting a gas burning appliance to a gas supply line comprising two separable members adapted to be coupled and uncoupled by relative endwise movement, one of said members adapted to be connected to the gas supply line and formed with a skirt defining an inlet chamber and a tapered neck of less diameter having a bore with a valve seat about the inlet end of the bore, a spider fixed in the inlet end of said chamber and having an axial opening for a valve stem, a valve stem extending axially through said chamber and into said bore, the inner end of said stem being entered in and guided by the axial opening of said spider, a second spider fixed to the other end of said stem and movable within said bore in contact with the bore wall for maintaining said stem in the axis of the bore, a valve on the stem between its ends and movable within said chamber against and away from said seat, a spring surrounding said stem between said first mentioned spider and said valve to normally seat said valve, the other of said members adapted to be connected to the gas burning appliance and having a part to receive the neck of said one member, said other member having a part enterable in the bore of said neck to move said stem to unseat the valve of said one member when said members are coupled together, a washer of resilient material carried by said other member at its entering end for compressibly engaging said neck of said one member to couple said members together, said neck having an annular recess to receive said washer in coupling relation so disposed as to be engaged by said washer only after said other member has been moved in endwise relation toward said one member a distance sufficient to unseat said valve, said spring possessing sufficient strength to separate said members and to seat said valve in the event of failure of said washer to hold.

DONALD G. KAPPELMAN.